(12) United States Patent
Sawa

(10) Patent No.: US 9,300,908 B2
(45) Date of Patent: Mar. 29, 2016

(54) INFORMATION PROCESSING APPARATUS AND INFORMATION PROCESSING METHOD

(71) Applicant: Kabushiki Kaisha Toshiba, Tokyo (JP)

(72) Inventor: Kazuhide Sawa, Akishima Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/479,138

(22) Filed: Sep. 5, 2014

(65) Prior Publication Data

US 2015/0070459 A1   Mar. 12, 2015

(30) Foreign Application Priority Data

Sep. 6, 2013   (JP) ................................. 2013-185107

(51) Int. Cl.
*H04N 7/14*   (2006.01)
*G06F 3/01*   (2006.01)

(52) U.S. Cl.
CPC .................. *H04N 7/142* (2013.01); *G06F 3/01* (2013.01); *H04N 7/147* (2013.01)

(58) Field of Classification Search
CPC ......... H04N 7/14; H04N 7/142; H04N 7/147; G06F 2/01
USPC ............................................ 348/14.01–14.16
See application file for complete search history.

(56) References Cited

U.S. PATENT DOCUMENTS

2010/0238194 A1*   9/2010   Roach, Jr. ................ H04M 3/42
                                                                           345/629
2013/0111351 A1*   5/2013   Huang ................. G06F 3/03547
                                                                           715/740

FOREIGN PATENT DOCUMENTS

JP   2004056405 A   2/2004
JP   2005303360 A   10/2005
JP   2009301215 A   12/2009

* cited by examiner

*Primary Examiner* — Melur Ramakrishnaiah
(74) *Attorney, Agent, or Firm* — Patterson & Sheridan, LLP

(57) ABSTRACT

The present invention provides an information processing apparatus which includes a camera which photographs a subject to be photographed, a transmission module which transmits an image of the subject to be photographed by the camera to another information processing apparatus, a receiving module which receives coordinate information relating to a designated area within the image of the subject to be photographed, and a display module which displays an image of the subject to be photographed within the designated area based on the coordinate information transmitted from the another information processing apparatus so that a user can grasp the subject to be photographed within the designated area. According to the information processing apparatus thus configured, when one communication party points a subject displayed on a screen in a videophone etc., the other communication party can easily recognize the pointed portion.

7 Claims, 6 Drawing Sheets

INFORMATION PROCESSING APPARATUS AND INFORMATION PROCESSING METHOD

CROSS-REFERENCE TO RELATED APPLICATION(S)

The application is based upon and claims the benefit of priority from Japanese Patent Application No. 2013-185107 filed on Sep. 6, 2013, the entire contents of which are incorporated herein by reference.

FIELD

Embodiments described herein relate to an information processing apparatus and an information processing method.

BACKGROUND

There have been known televisions each having a videophone function using a software installed therein. Further, an input method using an input device capable of detecting the position of a hand, as represented by an image sensor used for estimating a posture based on the position recognition of a human body, and an input method using a touch display in a tablet terminal or a PC (personal computer) have been widespread, for example. In other investigation fields, there has been proposed an UI (user interface) for projecting a button near a hand or on a table based on an AR (augmented reality) using a compact projector, for example.

However, the videophones hitherto known have a problem that when one communication party points a subject displayed on a screen, it is difficult for the other communication party to recognize the pointed portion.

An object of an information processing apparatus according to an embodiment of this invention is to provide a technique in which, for example, in a case where one communication party points a subject displayed on a screen in a videophone to which this information processing apparatus is applied, the other communication party can easily recognize the pointed portion.

BRIEF DESCRIPTION OF DRAWINGS

A general architecture that implements the various features of the present invention will now be described with reference to the drawings. The drawings and the associated descriptions are provided to illustrate embodiments and not to limit the scope of the present invention.

DETAILED DESCRIPTION

Hereinafter, an information processing apparatus 100 according to the embodiment of this invention will be explained with reference to FIGS. 1 to 8.

According to one embodiment, the information processing apparatus includes a camera which photographs a subject to be photographed; a transmission module which transmits an image of the subject to be photographed by the camera to another information processing apparatus; a receiving module which receives coordinate information relating to a designated area within the image of the subject to be photographed; and a display module which displays an image of the subject to be photographed within the designated area based on the coordinate information transmitted from the another information processing apparatus so that a user can grasp the subject to be photographed within the designated area.

The information processing apparatus 100 according to the embodiment is an information processing apparatus having a display screen such as a tablet terminal, a slate device, an electronic book reader. The information processing apparatus 100 may be a big-screen TV (television set) having a supporting table.

Figure 1:
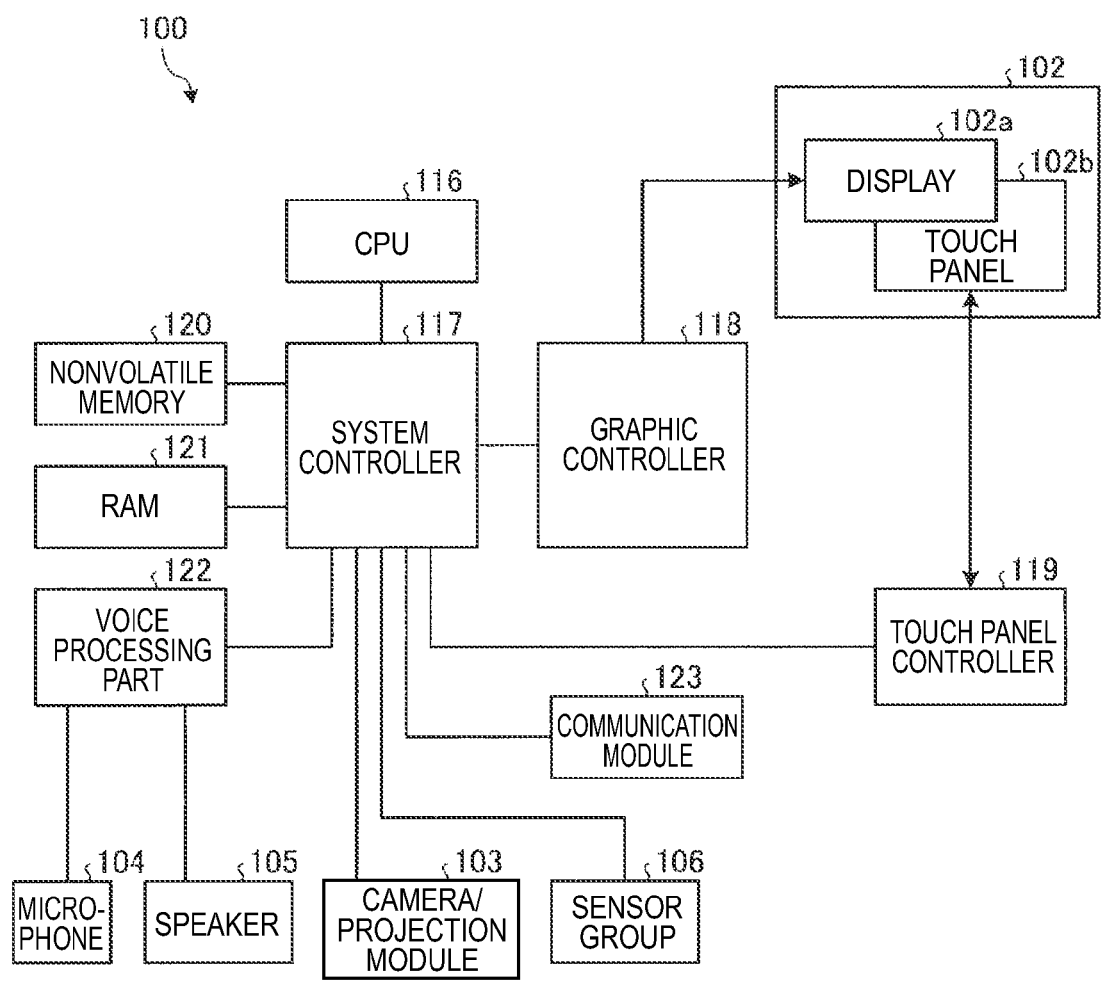
FIG. 1 is a block diagram showing an example of the hardware configuration of an information processing apparatus according to an embodiment.

As shown in FIG. 1, the information processing apparatus 100 includes a display part 102, a CPU (central processing unit) 116, a system controller 117, a graphic controller 118, a touch panel controller 119, a nonvolatile memory 120, a RAM (random access memory) 121, a voice processing part 122, a microphone 104, a speaker 105, a camera/projection module 103, (wireless) communication module 123 and a sensor group 106. The camera/projection module 103 includes at least one of a camera 103a and a compact projector 103b.

The display part 102 is a so-called a touch screen which is the combination of a display 102a and a touch panel 102b. The display 102a is an LCD (liquid crystal display) or an organic EL (electro luminescence), for example. The touch panel 102b detects a position (touch position) on the display screen of the display 102a touched by the finger of a user or a stylus pen etc.

The nonvolatile memory 120 stores an operation system, various kinds of application programs and various kinds of data necessary for executing the programs, for example. The CPU 116 is a processor for controlling the operation of the information processing apparatus 100 and controls the respective components of the information processing apparatus 100 via the system controller 117. The CPU 116 executes the operating system and the various kinds of application programs loaded into the RAM 121 from the nonvolatile memory 120 to thereby realize functions contained in the respective parts of a function part 210 described later. The RAM 121 provides a working area required for the CPU 116 to execute the programs, as the main memory of the information processing apparatus 100.

The CPU 116 executes the operating system and the various kinds of application programs loaded into the RAM 121 from the nonvolatile memory 120 to thereby realize functions for controlling the respective parts of the information processing apparatus 100.

The system controller 117 contains a memory controller for controlling the access to the nonvolatile memory 120 and the RAM 121. The system controller 117 has a function of executing the communication with the graphic controller 118, the touch panel controller 119 and the voice processing part 122. Further, the system controller 117 has a function of inputting a photographed image from the camera/projection module 103. Furthermore, the system controller 117 has a function of obtaining various kinds of information from the outside of the information processing apparatus 100 by using the communication module 123.

The graphic controller 118 is a display controller for controlling the display 102a of the display part 102. The touch panel controller 119 controls the touch panel 102b and obtains coordinate data representing a touch position by an operator from the touch panel 102b.

The microphone 104 converts collected voice into a signal corresponding to the intensity of the collected voice and outputs to the voice processing part 122. The speaker 105 converts a signal inputted from the voice processing part 122 into voice and outputs the voice. The camera/projection module 103 is directed toward a subject to be photographed by an operator to thereby photograph the subject and output the photographed image. In this embodiment, a subject being photographed and a subject being pointed are supposed to be a subject to be photographed and a subject to be projected by an operator using the camera/projection module 103, respectively.

Under the control of the CPU 116, the voice processing part 122 performs a voice processing such as voice synthesis to generate voice guidance etc. and outputs from the speaker 105, and also performs a processing with respect to voice collected by the microphone 104.

The communication module 123 executes, under the control of the CPU 116, a wireless communication with an external device and a communication via a network such as the internet.

The sensor group 106 includes a pointing sensor for, electrostatically or in an electromagnetic-coupling manner, detecting a pointing operation performed at the outside of the information processing apparatus 100, and a depth sensor 103c as an optical sensor for detecting a moving amount of a subject (finger etc.) moved toward the depth direction from the screen (display part 102) of the information processing apparatus 100, for example. The detected signals from the respective sensors are outputted to the CPU 116.

Figure 2:
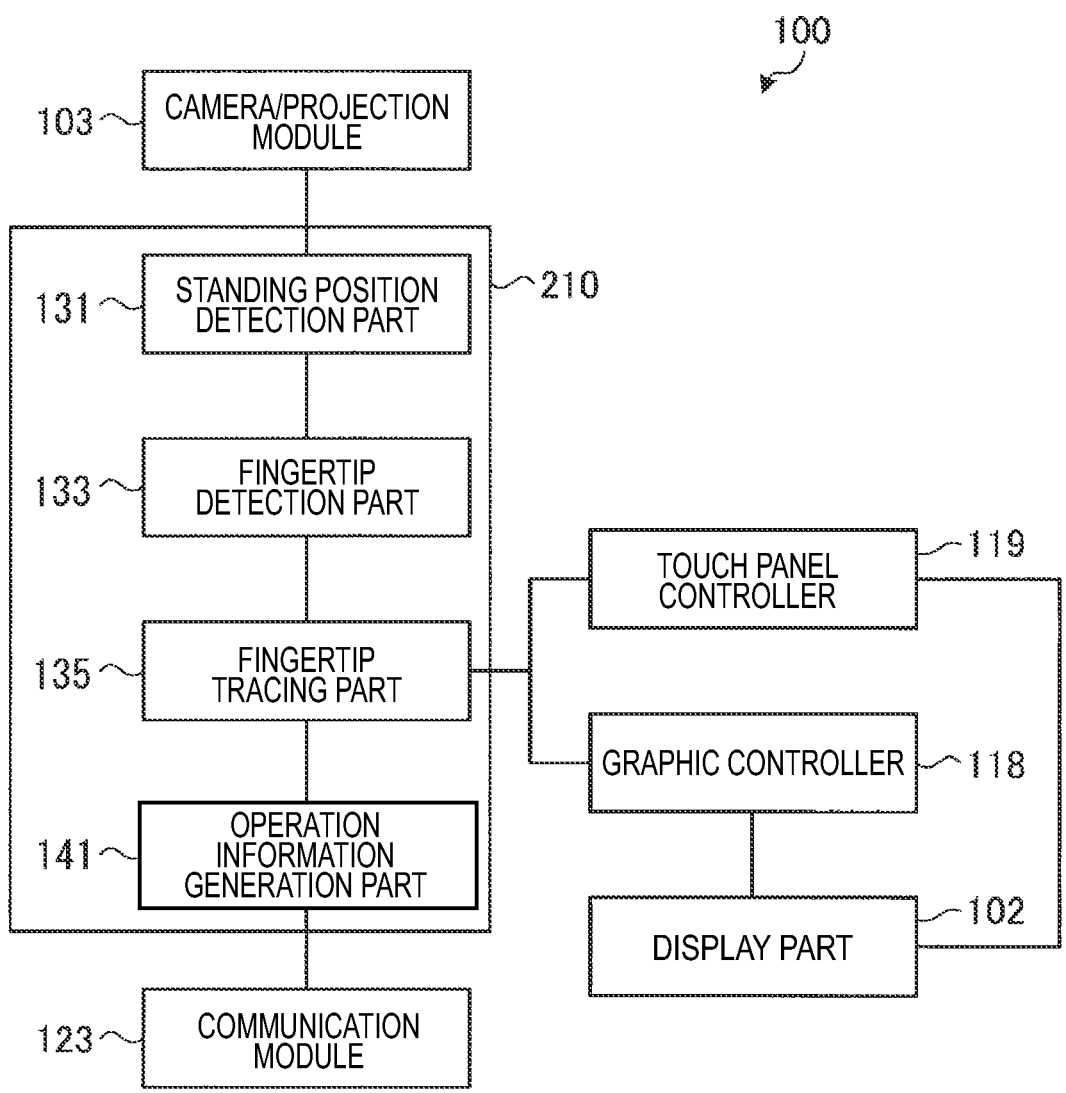
FIG. 2 is a block diagram showing the configuration of a function part and the configuration relating to the function part in the information processing apparatus

FIG. 2 is a block diagram showing the configuration of the function part 210 and the configuration relating to the function part 210 in the information processing apparatus 100. As shown in FIG. 2, the information processing apparatus 100 includes the function part 210 as the functional configuration realized by executing the programs by the CPU 116, in addition to the aforesaid camera/projection module 103, the display part 102, the touch panel controller 119, the graphic controller 118 and the communication module 123. To be more concrete, in this embodiment, the functions of the respective parts of the function part 210 described later is executed in cooperation with the CPU 116 and the programs (the operating system and the various kinds of application programs) stored in the nonvolatile memory 120.

As shown in FIG. 2, the function part 210 includes a standing position detection part 131, a fingertip detection part 133, a fingertip tracing part 135 and an operation information generation part 141. The function part 210 stores, in the RAM 121, the results of various kinds of image analysis processings relating to a standing position detection and a finger tip detection, described later, performed by these parts and information generated based on the processing results.

The standing position detection part 131 detects the standing position of an operator with respect to the display screen. To be more concrete, the standing position detection part 131 detects the standing position of an operator according to image recognition based on an image photographed by the camera 103a of the camera/projection module 103. In this case, for example, the standing position detection part 131 may firstly detect the position of the face of an operator and then specify the position of the body of the operator from the position of the face and the image other than the face. The standing position detection part 131 can detect the position of an operator not only in the case where the operator is standing but also in the case where the operator is sitting or lying.

For example, based on information representing the features of the face such as eyes, nose, mouth of a viewer which is stored in advance, the standing position detection part 131 detects, as a face, a part within an image coinciding with these features based on the image photographed by the camera 103a of the camera/projection module 103.

To be more concrete, the standing position detection part 131 firstly detects the face of an operator from the image photographed by the camera 103a and specifies the position thereof. Then, the standing position detection part 131 specifies the coordinate of the center position of the face of the operator in an x-axis direction and an y-axis direction and a distance z between the operator and the information processing apparatus 100, as the position (x, y, z) of the face of the operator. In this respect, for example, the standing position detection part 131 specifies the distance z between the operator and the information processing apparatus 100 based on the detected width of the face and the detected distance between the right eye and the left eye of the operator.

The distance between the operator and the display screen of the information processing apparatus 100 is a distance between the operator and the camera/projection module 103 of the information processing apparatus 100, for example. The standing position detection part 131 detects the face of a person or recognizes subjects in a particular area within a photographing range by the camera 103a of the camera/projection module 103 to thereby specify the sizes of the face or the subjects, thereby determining that the distance is long when the face or the subject is small and the distance is short when the face of the subject is large. Further, the standing position detection part 131 may determine the direction of the display part 102 of the information processing apparatus 100 based on the in-plane rotation direction of the face or subject thus recognized.

The aforesaid face detection may be performed by a face detection part (not shown) in place of the standing position detection part 131.

The fingertip detection part 133 detects the fingertip of an operator. To be more concrete, the fingertip detection part 133 detects an extended portion of the arm or hand of an operator as the fingertip based on the information relating to the position of the operator detected by the standing position detection part 131. In this manner, since the fingertip detection part 133 detects the fingertip of an operator by using the information relating to the position of the operator detected by the standing position detection part 131, detection accuracy and detection speed is excellent.

The fingertip tracing part 135 specifies the position of the fingertip of an operator thus detected and also outputs newest positional information of the position of the fingertip which changes in accordance with the movement of the fingertip. In the information processing apparatus 100 according to this embodiment, the fingertip tracing part 135 can specify the newest position of the fingertip with high accuracy by performing a filtering processing taking into the past positional information of the fingertip into consideration. For example, the newest position of the fingertip can be obtained by performing the filtering processing for eliminating noise using a Kalman filter which uses the two-dimensional coordinate position as a state variable.

The operation information generation part 141 generates a circle surrounding a subject located at the newest fingertip position and also generates the coordinate information of the circle to thereby transmit the coordinate information to the communication module 123. Alternatively, when there is past data of a circle drawn by the fingertip position, this circle may be used. Further, alternatively, when there is past data representing that the fingertip position was moved toward a constant direction, an ellipse formed by enlarging along this direction a circle surrounding a subject located at the newest fingertip position may be used. In this case, the coordinate information generated by the operation information generation part 141 includes the coordinates of the circle or the ellipse.

Figure 3:
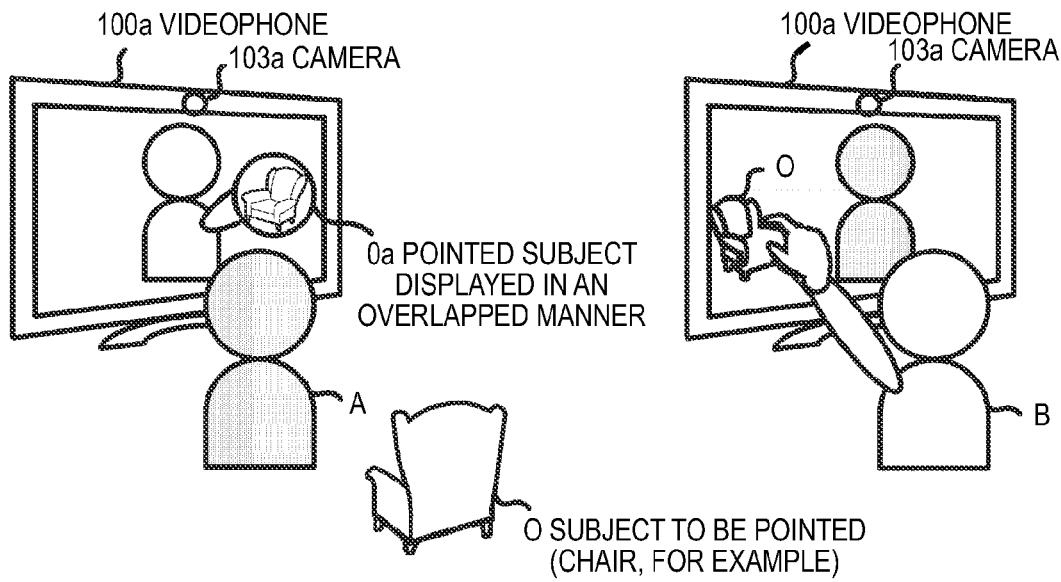
FIG. 3 is a diagram showing a state that, in a videophone realized by the information processing apparatus according to the embodiment, a pointed subject is displayed in an overlapped manner on the display screen of the videophone of the other communication party who is displayed on the display screen of the videophone of one communication party.

FIG. 3 shows an example where, in the videophone 100*a* realized by the functional configuration of the information processing apparatus 100 shown in FIG. 2, a pointed subject is displayed in an overlapped manner on the display screen of the videophone of the other communication party who is displayed on the display screen of the display part 102 of the videophone of one communication party.

In a state that the videophone 100*a* is used for the communication between a user A and a user B, when the user B points by a finger a chair O behind the user A displayed on the display screen of the videophone 100*a* on the user B side (see the right side figure in FIG. 3), the function part 210 detects the position (pointed position) on the display screen pointed by the finger of the user B and specifies the coordinate of the pointed position. The communication module 123 transmits the coordinate of the pointed position by the user B specified by the function part 210 to the videophone 100*a* on the user A side. The method of pointing a particular position on the display screen by the user B is not limited to the pointing using a finger. For example, in the case where the display screen of the videophone 100*a* on the user B side is a touch screen, the user B may touch a particular position on the display screen to thereby point this position. Alternatively, the pointing may be performed by using a sensor 103*c* (sensor group 106, for example) which detects the position of a hand when the hand is held on the front side than the position of a designated distance.

Figure 4:
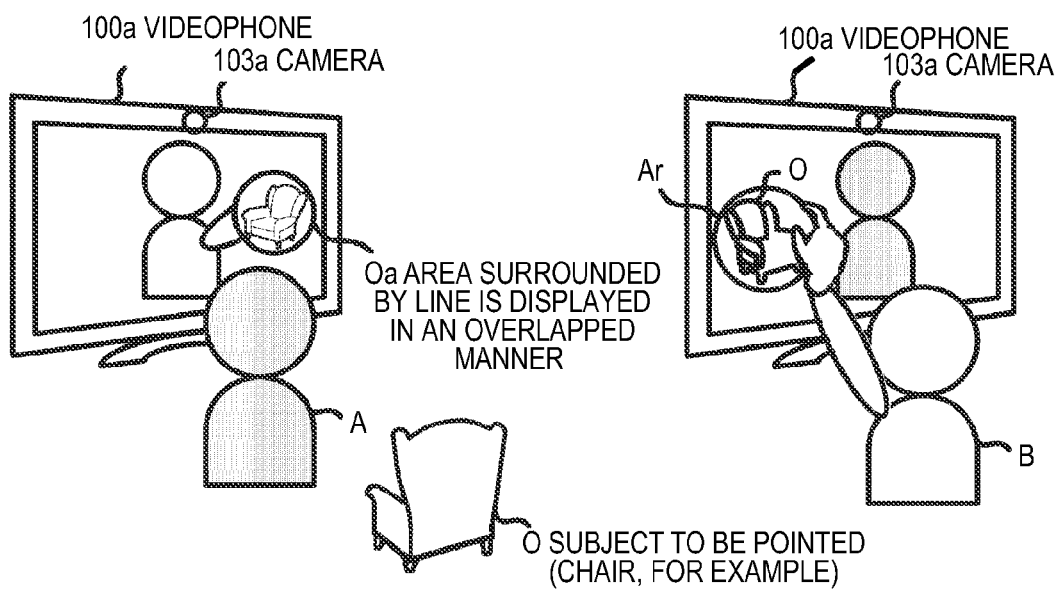
FIG. 4 is a diagram showing an example where a pointed area is designated by surrounding it using a line, in the videophone realized by the information processing apparatus according to the embodiment.

Alternatively, when the display screen of the videophone 100*a* on the user B side is a touch screen, as shown in FIG. 4, the pointed position may be specified in a manner that the user B surrounds by using a line ("Ar" on the right side figure in FIG. 4) an area containing a subject to be pointed (to detect past data of a circle drawn by the fingertip). On the display screen of the videophone 100*a* on the user A side, the area (area surrounded by the line Ar in FIG. 4) pointed by the user B is displayed on an image containing the user A displayed on the screen of the videophone 100*a* on the user B side. This area on the display screen of the videophone 100*a* on the user A side is displayed in an overlapped manner on the image of the hand of the user B pointing within the screen. In this respect, the display position of the image of this area pointed by the user B is not limited to the display position of the image of the hand of the user B within the display screen of the videophone 100*a* on the user A side. That is, the image of this area pointed by the user B may be displayed at an arbitrary other position within the display screen of the videophone 100*a* on the user A side.

Figure 5:
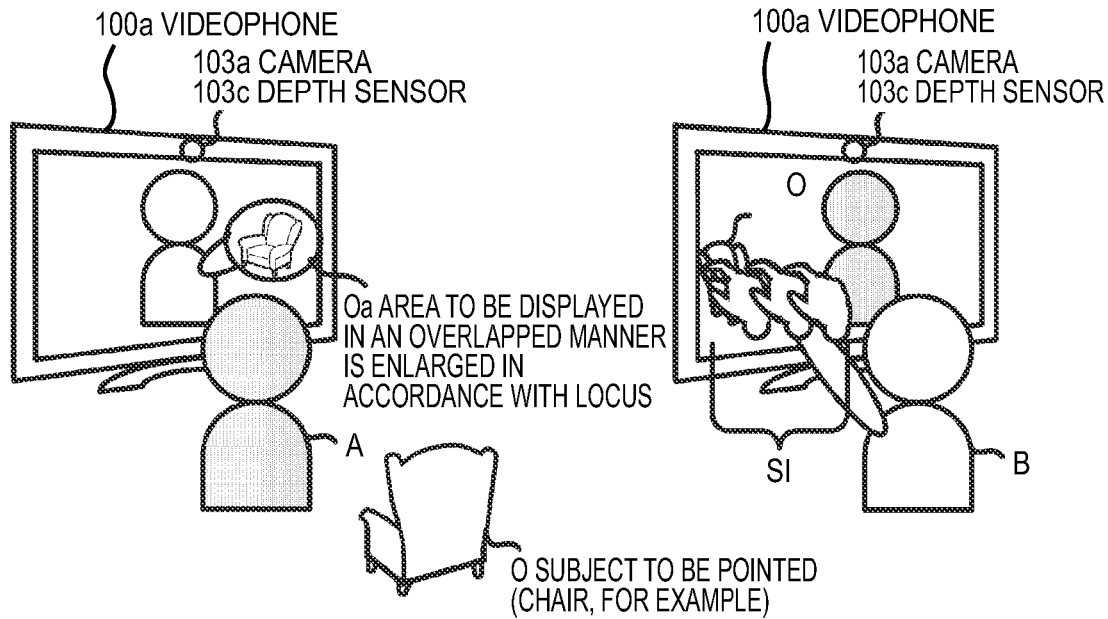
FIG. 5 is a diagram showing a state that a pointed area is displayed widely by using a locus of the pointed position, in the videophone realized by the information processing apparatus according to the embodiment.

FIG. 5 is a diagram showing a state that, in the pointing operation by the user B, a large area S1 represented by using the past data of the pointed position having been moved is set as a pointed area Oa by using the locus information of the pointed position and displayed on the display screen of the videophone 100*a* on the user A side. The past data of the pointing operation to be contained as the pointed area may be set arbitrarily by means of user setting etc.

Figure 6:
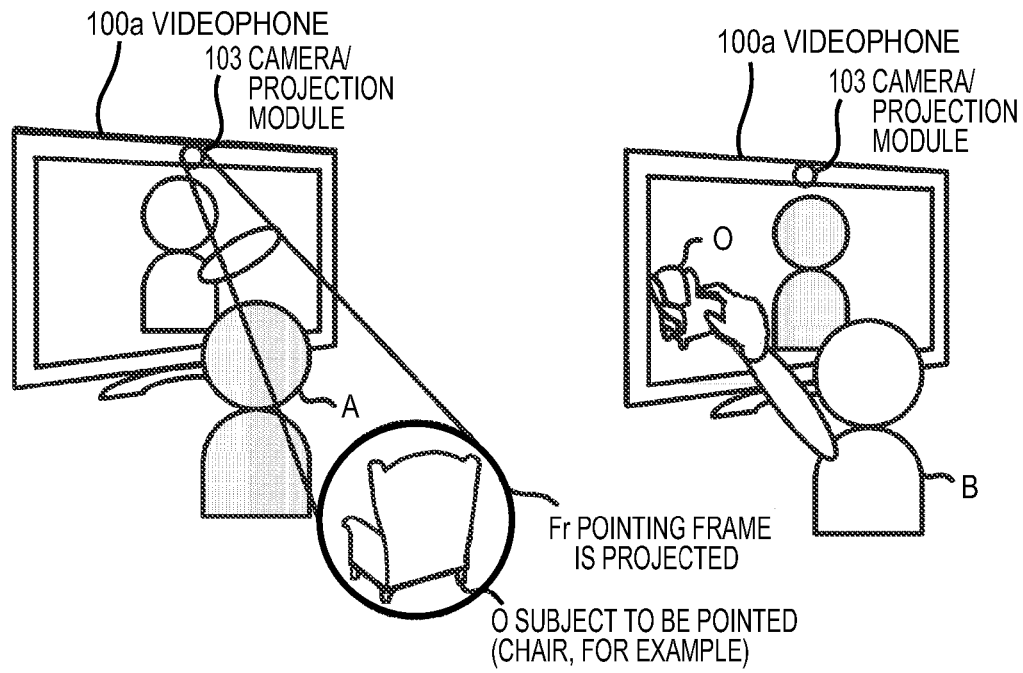
FIG. 6 is a diagram showing a state that a camera/projection module projects on an actual subject existing at the pointed position, in the videophone realized by the information processing apparatus according to the embodiment.

FIG. 6 is a diagram showing a state that the information processing apparatus 100*a* on the user A side projects a frame ("Fr" on the left side figure in FIG. 6) on an actual subject existing at the position pointed by the user B, by using the pointed position of the user B received from the information processing apparatus 100*a* on the user B side. In this respect, the information processing apparatus 100*a* on the user A side may projects a light on the actual subject existing at the pointed position of the user B in place of the frame.

Figure 7:
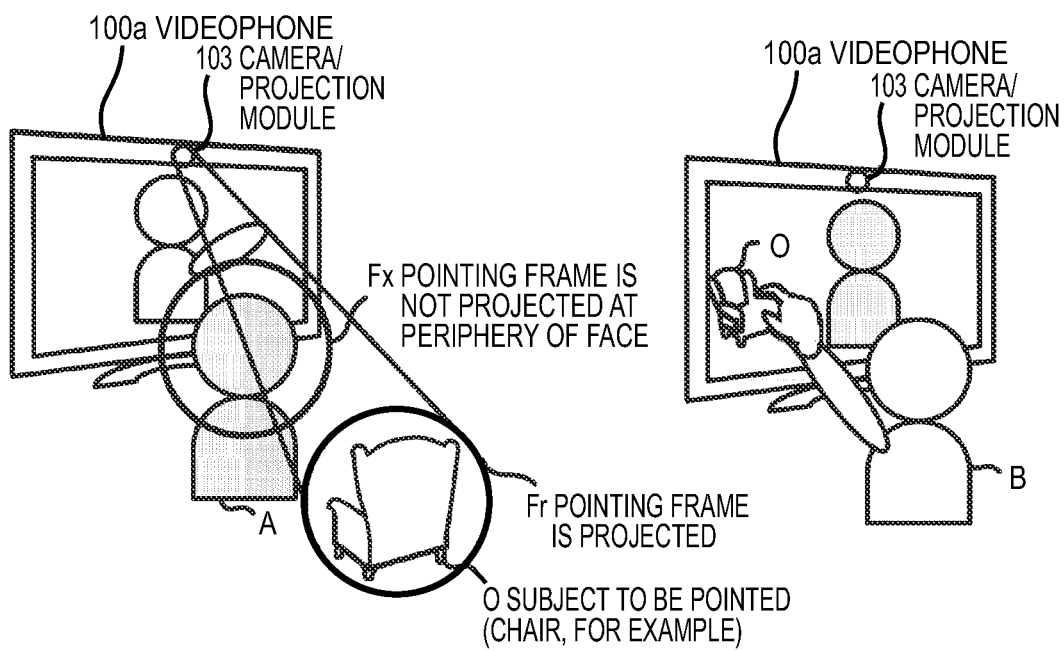
FIG. 7 is a diagram showing a state that the peripheral area Fx of the face of a user A is prevented from being projected by a frame or light by detecting the face of the user A existing near a subject to be pointed, in the videophone realized by the information processing apparatus according to the embodiment.

FIG. 7 is a diagram showing a state that the peripheral area Fx of the face of the user A is prevented from being projected by the frame or light by detecting the face of the user A existing near the subject to be pointed.

Figure 8:
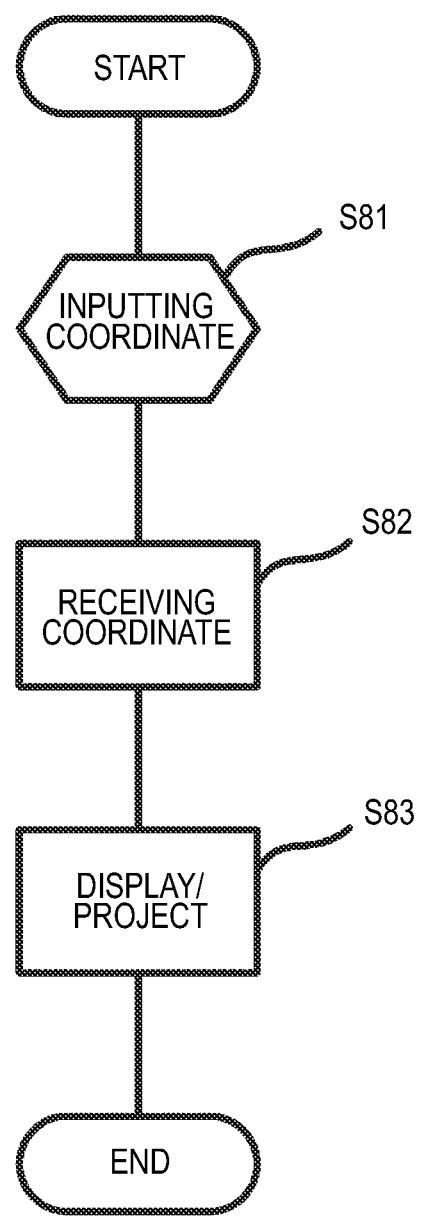
FIG. 8 is a flowchart showing an information processing method performed by the videophone shown in FIGS. 3 to 7.

FIG. 8 is a flowchart showing the information processing method performed by the information processing apparatus 100*a* shown in FIGS. 3 to 7.

In step S81, when the user B performs the pointing operation on the display screen of the information processing apparatus 100*a*, coordinate information corresponding to the position or area designated by this pointing operation is specified in this information processing apparatus 100*a*. This coordinate is specified in a manner that the function part 210 processes the image photographed by the camera 103*a*.

In step S82, when the communication module 123 of the information processing apparatus 100*a* on the user B side transmits this coordinate information, the communication module 123 of the information processing apparatus 100*a* on the opposite side, that is, the user A side receives this coordinate information.

In step S83, the information processing apparatus 100*a* on the user A side displays the pointed area on the display 102*a* or projects the frame at the periphery of the pointed area by the camera/projection module 103*b*.

In the videophone of the related art, even when one communication party points a particular position by the finger, it is difficult for the other communication party to recognize the pointed portion. In contrast, in the information processing apparatus 100*a* according to this embodiment, a position or area pointed by the one communication party is presented by a pointer to the other communication party. Thus, since the other communication party can easily recognize the pointed position or area, they can communicate smoothly to each other. Further, also in the case where a position or area pointed by the one communication party is presented by projecting a frame to the other communication party, the face of the other communication party is detected to thereby prevent the frame from being projected at the periphery of the face of the other communication party. Thus, the other communication party does not feel dazzle.

The present invention is not limited to the aforesaid embodiment and can be implemented by being modified in various manners in a range not departing from the gist thereof. Further, the present invention does not necessarily require all the constituent elements of the aforesaid embodiment and hence some of the constituent elements thereof may be eliminated. Further, the constituent elements of different embodiments may be suitably combined. Furthermore, the present invention also includes subcombinations of a plurality of the constituent elements disclosed in the aforesaid embodiments.

What is claimed is:

1. An information processing apparatus comprising:
    a camera which photographs a subject to be photographed;
    a transmission module which transmits an image of the subject to be photographed by the camera to another information processing apparatus;
    a receiving module which receives coordinate information relating to a designated area within the image of the subject to be photographed; and
    a display module which displays an image of the subject to be photographed within the designated area based on the coordinate information transmitted from the another information processing apparatus so that a user can grasp the subject to be photographed within the designated area.

2. The information processing apparatus according to claim 1, wherein
    the display module includes a display which displays the image of the subject to be photographed, and the display module displays, on the display, the image of the subject to be photographed within the designated area in association with an image to be displayed on the display.

3. The information processing apparatus according to claim 1, wherein the coordinate information is a coordinate of a circle.

4. The information processing apparatus according to claim 1, wherein the coordinate information is a coordinate of an ellipse.

5. The information processing apparatus according to claim 1, further comprising:
    a projection module which projects an image on the subject to be photographed based on the coordinate information.

6. The information processing apparatus according to claim 5, further comprising:
    a face detection module which detects a face of a person within a projection range by the projection module, wherein the projection module projects the image in a manner that avoids the face of the person detected by the face detection module.

7. An information processing method using an information processing apparatus that includes a camera which photographs a subject to be photographed and a transmission module which transmits an image of the subject to be photographed by the camera to another information processing apparatus, comprising the steps of:
    transmitting the image of the subject to be photographed photographed by the camera to the another information processing apparatus;
    receiving coordinate information of the image of the subject to be photographed from the another information processing apparatus;
    obtaining information representing a part of the image of the subject to be photographed based on the coordinate information from the another information processing apparatus; and
    displaying the part of the image of the subject to be photographed based on the obtained information so that a user can grasp the part of the image of the subject to be photographed.

* * * * *